United States Patent
Tierney et al.

(10) Patent No.: US 10,669,659 B2
(45) Date of Patent: Jun. 2, 2020

(54) ALIGNED DISCONTINUOUS FIBER PREFORMS, COMPOSITES AND SYSTEMS AND PROCESSES OF MANUFACTURE

(71) Applicants: John Tierney, Wilmington, DE (US); Alex Vanarelli, Westfield, NJ (US); Dirk Heider, Newark, DE (US); Shridhar Yarlagadda, Newark, DE (US); John W. Gillespie, Jr., Hockessin, DE (US)

(72) Inventors: John Tierney, Wilmington, DE (US); Alex Vanarelli, Westfield, NJ (US); Dirk Heider, Newark, DE (US); Shridhar Yarlagadda, Newark, DE (US); John W. Gillespie, Jr., Hockessin, DE (US)

(73) Assignee: University of Delaware, Newark, DE (US)

( * ) Notice: Subject to any disclaimer, the term of this patent is extended or adjusted under 35 U.S.C. 154(b) by 0 days.

(21) Appl. No.: 16/054,405

(22) Filed: Aug. 3, 2018

(65) Prior Publication Data
US 2019/0048500 A1  Feb. 14, 2019

Related U.S. Application Data

(60) Provisional application No. 62/542,375, filed on Aug. 8, 2017.

(51) Int. Cl.
| | | |
|---|---|---|
| D04H 1/74 | (2006.01) | |
| B29C 70/50 | (2006.01) | |
| B29C 70/14 | (2006.01) | |
| B32B 5/02 | (2006.01) | |
| B32B 5/12 | (2006.01) | |

(Continued)

(52) U.S. Cl.
CPC .............. *D04H 1/74* (2013.01); *B29C 70/14* (2013.01); *B29C 70/50* (2013.01); *B32B 5/022* (2013.01); *B32B 5/12* (2013.01); *B32B 5/26* (2013.01); *C08J 5/24* (2013.01); *D04H 1/4374* (2013.01); *B32B 2250/20* (2013.01); *C08J 2363/00* (2013.01); *C08J 2379/08* (2013.01); *C08J 2381/06* (2013.01); *C08J 2479/08* (2013.01); *C08J 2481/06* (2013.01); *D10B 2505/02* (2013.01)

(58) Field of Classification Search
CPC ....................................................... D04H 1/74
USPC ........................................................ 428/113
See application file for complete search history.

(56) References Cited

U.S. PATENT DOCUMENTS

| | | |
|---|---|---|
| 3,808,095 A | 4/1974 | McKnight |
| 4,759,985 A | 7/1988 | Armiger et al. |

(Continued)

FOREIGN PATENT DOCUMENTS

WO   2014170637 A1   10/2014

OTHER PUBLICATIONS

International Search Report and Written Opinion for International Application No. PCT/US18/45194, dated Dec. 21, 2018, 12 pages.

(Continued)

*Primary Examiner* — Brent T O'Hern
(74) *Attorney, Agent, or Firm* — RatnerPrestia (57) ABSTRACT

A system and method for aligning discontinuous fibers, manufacturing tailored preforms, and composite materials comprised of highly aligned discontinuous fibers.

32 Claims, 7 Drawing Sheets

(51) Int. Cl.
*B32B 5/26* (2006.01)
*C08J 5/24* (2006.01)
*D04H 1/4374* (2012.01)

(56) References Cited

U.S. PATENT DOCUMENTS

| | | | |
|---|---|---|---|
| 5,057,253 | A | 10/1991 | Knoblach |
| 6,066,235 | A * | 5/2000 | Scheinberg .............. D21F 9/02 |
| | | | 162/131 |
| 6,477,740 | B1 | 11/2002 | Hansen |
| 2012/0193059 | A1 | 8/2012 | Haussler et al. |
| 2012/0279017 | A1 | 11/2012 | Reussmann et al. |
| 2017/0095981 | A1 | 4/2017 | Xu |

OTHER PUBLICATIONS

Marlett, K., "Hexcel 8552 IM7 Unidirectional Prepreg 190 gsm & 35% RC Qualification Material Property Data Report", NCAMP Report: CAM-RP-2009-015 Rev A—238 pages.

Such et al., Aligned Discontinuous Fibre Composites: A Short History. Journal of Multifunctional Composites, vol. 3, 2014—pp. 155-168.

International Preliminary Report on Patentability and Written Opinion for International Application No. PCT/US2018/045194, dated Feb. 11, 2020, 9 pages.

* cited by examiner

ALIGNED DISCONTINUOUS FIBER PREFORMS, COMPOSITES AND SYSTEMS AND PROCESSES OF MANUFACTURE

CROSS REFERENCE TO RELATED APPLICATIONS

This application claims the benefit of provisional U.S. Patent Application No. 62/542,375, filed Aug. 8, 2017, which is fully incorporated herein by reference.

GOVERNMENT LICENSE RIGHTS

This invention was made with government support under Contract No. HR0011-16-2-0014 awarded by DARPA. The government has certain rights in the invention.

FIELD OF THE INVENTION

The disclosure relates to an aligned discontinuous fiber composite material, and method of manufacturing the aligned discontinuous fiber composite material.

BACKGROUND OF THE INVENTION

Aspects of the present invention relate to an aligned discontinuous fiber composite and method of manufacture for production of highly aligned discontinuous fiber composite material that is comprised of a highly aligned discontinuous fiber dry preform, that can be impregnated with a polymer and consolidated or cured to produce prepreg, multi-layer blanks or a composite structure with high fiber volume fraction. Aligned discontinuous fiber composite materials, sourced as new, chopped from continuous or recycled fiber reinforcement, can offer stiffness and strength comparable to continuous fiber composites, provided similar fiber volume fractions can be achieved (~55-60% for high-performance composite materials). In addition, they offer benefits of lower cost and provide significant processing advantages in terms of drapability, formability and steerability.

Aligned discontinuous fiber composites enable high levels of in-plane deformation (extension and shear), interlayer slip and compressibility when deformed as a dry preform prior to impregnation with polymer, or within a composite blank material during forming of all types (vacuum forming, bladder forming, sheet forming, stamp forming, etc.). Blanks can be multi-layer with any stacking sequence. Layer thickness is controlled during the alignment process and combined with the preforming methods, enable preforms and prepregs with controlled areal weight (thin-ply 8 grams/m$^2$ (or lower) to standard 190 grams/m$^2$ or higher) and composite blank manufacture for minimum gage applications. Fabrication of complex geometry composite structures with aligned discontinuous fiber forms eliminate complex ply patterns and darting, improves quality (eliminates wrinkling common to continuous fiber) and reduces preform costs. These attributes makes this composite material suitable for complex geometry production of aerospace parts, automotive products, consumer electronic products, sporting goods and any lightweight product that requires laminate forms with high curvatures and tight radius features, properties equivalent to continuous fiber and lower part cost. This composite material is ideal for replacement of metal parts produced by sheet forming and stamping at high rates.

Additionally, the ability to use discontinuous fibers from recycled composite materials creates a low-cost material source allowing near 100% property translation of recycled materials for reuse in parts of equal value (downcycling to make parts of lower value can be minimized).

Aligned discontinuous fiber composite materials can also be used as a source material for FDM (Fused Deposition Modeling), 3D additive processing and in tape form for automated fiber or tape placement processing of large structures. These processes can leverage the anisotropic performance of continuous fiber composite properties using aligned discontinuous fibers within that structure that requires complex coursing and non-geodesic paths, to meet design requirements for optimized structural performance. In tow and tape form, aligned discontinuous fiber processing by FDM and advanced tape placement can be steered to greater angles without wrinkling. Current approaches to fiber-reinforced feedstock for additive manufacturing have limitations in achievable fiber volume fractions (less than 25% compared to 55-60% for high-performance), which limits part performance. Aligned discontinuous fiber feedstock with volume fractions approaching 60% would represent a significant improvement in performance for additively manufactured parts. Discontinuous fiber architecture will allow complex geometry manufacture enabled by in-plane stretch and steerability. Thin ply formats (15-125 μm in single ply thickness) allow for very fine tailoring of stacking sequence during FDM.

Hybridized aligned discontinuous fibers offer multifunctional properties at lower cost while maintaining manufacturing advantages. Hybridization can occur at the fiber level within a single layer as well as traditional hybridization on a layer to layer basis or both. Multifunctional properties include mechanical (stiffness, strength, fracture toughness and ductility), thermal, electrical, and electromagnetic properties, etc. This process controls fiber and matrix type, fiber length and aspect ratio, fiber volume fraction and layer thickness. This process allows for combining and highly aligning any number of fiber types (structural or non-structural) and their weight fractions into a highly aligned discontinuous layer. It also offers the ability to manufacture co-mingled preforms by mixing and aligning of polymer fibers at the filament level that form the matrix with any combination of structural and non-structural fibers.

One challenge encountered when fabricating a highly aligned discontinuous fiber ply is developing a process or combination of processes that can align large quantities of individual discontinuous fibers to a high degree at high volume fractions and low cost to be competitive with current continuous fiber ply production, while having comparable or superior mechanical properties. Historically, discontinuous fiber composites are produced without controlled alignment as a randomly oriented system (random mat), a discontinuous fiber chopped prepreg in a thermoplastic or thermoset matrix, or within an injection or compression molded composite where fiber orientation is governed by fluid (resin) flow behavior within a cavity. These historical processes result in low stiffness and strength when compared to continuous composite structures.

A comprehensive review of prior art in highly aligned discontinuous fiber composites is available in the literature. See, e.g., Such, M., Ward, C., & Potter, K. (2014). Aligned discontinuous fibre composites: a short history. Journal of Multifunctional Composites, 2(3). Highly aligned discontinuous fiber composites have been fabricated with two general approaches, with alignment methods for discontinuous fibers of a specific length, or by inducing fiber breaks in continuous fiber bundles or tows. As has been documented in the literature, the latter approach creates a heterogeneous microstructure with non-uniform fiber lengths with lengths generally an order of magnitude larger (greater than 50 mm for 5-7 micron carbon fibers) than makes rapid forming of complex geometries difficult.

WO 2014/170637 A1, (HiPerDiF process) describes a manufacturing process for aligning discontinuous fibers in a water suspension flowing in a channel comprised of a pair of solid surfaces or walls to create tape with fibers aligned in the belt direction. The technique shows good alignment, but only discloses production of aligned fibers along the belt travel direction and is limited in throughput and width production. Composite performance with this approach has shown 75% or less strength translation compared to a continuous fiber equivalent, as well as fiber aspect ratios less than 500. The physics of fiber alignment is different with respect to the process described herein capable of producing sheets of any width. Additionally, the process disclosed in WO 2014/170637 discloses only the formation of relatively small-width tapes with all fibers aligned with the length of the tape.

SUMMARY OF THE INVENTION

Aspects of the invention generally relate to a manufacturing process which includes the process of introducing and dispersing discontinuous fibers within a carrier fluid; passing the dispersed fibers to a conduit; creating a free surface fiber-fluid thin film; depositing the fibers upon a porous carrier substrate in a highly controlled and aligned manner; extracting the fluid; stabilizing the fibers on a moving carrier under vacuum at prescribed ply angles; to create a ply material form, such as for use in composite production.

Aspects of the invention also generally relate to a system for aligning discontinuous fibers, comprising: a porous belt having a direction and velocity of travel; a free surface positioned above the porous belt and oriented at an oblique angle relative to the belt, the free surface having a proximal end adjacent the belt oriented along an impingement axis; and a conduit having a discharge configured to distribute onto the free surface a fluid mixture including the discontinuous fibers dispersed in a carrier fluid, the discharge positioned to cause the fluid mixture to traverse the free surface in a thin film with gravity assistance toward the proximal end of the free surface. The system is configured to dispose the fibers aligned within a predetermined range of alignment with one another on the porous belt and the carrier fluid to pass through the belt.

Aspects of the invention also generally relate to a process for aligning discontinuous fibers, comprising: (i) distributing a first fluid mixture including a first plurality of discontinuous fibers dispersed in a first carrier fluid onto a first free surface to cause the fluid mixture to traverse the free surface in a thin film with the assistance of gravity toward a porous belt positioned beneath the free surface; (ii) moving the porous belt in a travel direction; and (iii) depositing the fluid mixture onto the porous belt from the free surface and causing the fibers to align together along a first impingement axis to form a first layer of aligned fibers and causing the carrier fluid to separate from the fibers and pass through the porous belt.

Aspects of the invention also generally relate to a system for combining aligned discontinuous fiber layers into composite preforms, the system comprising: a porous belt having a direction and velocity of travel; one or more layer removal stages configured to remove a cover and carrier layer from a respective aligned discontinuous fiber layer while transferring the respective aligned discontinuous fiber layer to the porous belt; a drying stage for removing any liquid remnants from the aligned discontinuous fiber layers; a polymer stage configured to introduce either a polymer binder or a thermoset or thermoplastic polymer film onto the aligned discontinuous fiber layer; a heating and consolidation stage configured to apply heat and pressure to impregnate the binder or polymer film into an aligned discontinuous fiber layer, thereby forming an aligned discontinuous fiber composite material preform; and a cooling and take up stage for cooling and removing the aligned discontinuous fiber composite material preform from the porous belt.

Aspects of the invention also generally relate an aligned discontinuous fiber composite product comprising a matrix of fibers and a free and uncut edge extending along an edge axis, wherein a longitudinal axis of the majority of (e.g. at least 95 percent) of the fibers in the composite product are non-parallel to the edge axis.

Described herein is also an aligned discontinuous fiber composite and method of manufacture for production of a highly-aligned-discontinuous-fiber composite material that can be impregnated and consolidated or cured to produce a composite product. The composite microstructure at the ply level, embodies a network of discontinuous fibers aligned in one direction having a selected range of fiber volume fraction and fiber length providing comparable stiffness and strength to commercially available continuous fiber prepreg materials, with increased formability.

The exemplary processes and structures described herein may comprise any type of fiber or combination of fibers, including but not limited to carbon fibers, glass fibers, ceramic fibers, metal fibers, polymer fibers, natural fibers, recycled fibers, and nanofibers. In general, the discontinuous fiber materials have an aspect ratio (length to effective diameter) of greater than one.

Aspects of the invention enable the production of a wide variety of material forms including, but not limited to the following forms:

1) Dry Preforms including:
   a) Dry preform sheets with controlled areal weight/fiber volume fraction/ply thickness that include, but are not limited to, the following materials: aligned polyacrylonitrile (PAN) carbon discontinuous fiber dry preforms, aligned pitch carbon discontinuous fiber dry preforms, aligned glass discontinuous fiber dry preforms, aligned polymer discontinuous fiber dry preforms, aligned natural fiber discontinuous fiber dry preforms, aligned high aspect ratio nanomaterial preforms, aligned recycled fibers of any type, aligned metal discontinuous fiber preforms, and aligned ceramic discontinuous fiber preforms.
   b) Aligned hybrid discontinuous fiber dry preforms (mixtures of all of the above in section 1(a)), including hybridization of fiber diameters and fiber aspect ratios.
   c) Aligned discontinuous fiber (all of the above and mixtures of all of the above) preforms for complex curvature that do not wrinkle or require darting.
   d) Aligned discontinuous fiber preforms with variable thickness created by ply drops and ply build-ups.
   e) Aligned discontinuous fiber preforms with controlled layer-by-layer orientation (continuous sheets with prescribed orientation or stacking sequence), including but not limited to all the above material combinations.
   f) Aligned and aligned/stabilized discontinuous fiber planar preforms with features from any and all combinations of 1(a) to 1(e).

g) Net shape dry preform tailored blanks that are comprised of stabilized aligned discontinuous fiber in all the above combinations from 1(a) to 1(e).
2) Thermoset material forms with aligned discontinuous fibers including but not limited to:
   a) Prepreg sheets and tailored blanks with a wide variety of thermoset resins, such as epoxy, vinyl ester, bismaleimide, cyanate ester, polyimides, polyester, polyurethanes, etc., with controlled areal weight and net fiber volume fraction.
   b) Dry preforms in (1) that can be infused/impregnated with thermoset resins prior to or after forming.
   c) Applies to all of the variants discussed in (1).
3) Thermoplastic material forms with aligned discontinuous fibers including but not limited to:
   a) Prepreg sheets and tailored blanks with a wide variety of thermoplastic resins, such as polyethylene (PE), polypropylene (PP), polyamide (PA), polyetherimide (PEI), polyphenylene sulfide (PPS), polyetheretherketone (PEEK), polyetherketoneketone (PEKK), polyimide (PI) etc., with controlled areal weight and net fiber volume fraction.
   b) Dry preforms in (1) that can be infused/impregnated with thermoplastic resins.
   c) Applies to all of the variants discussed in (1).
4) Material forms comprised of aligned discontinuous fiber surface coated with thermoplastic or thermoset polymer or particles or co-mingled with thermoset or thermoplastic polymer fibers:
   a) Material forms that include, but are not limited to, the above fiber combinations.
   b) Particles for controlled resin content, fiber volume fraction and porosity.
   c) Particle size for controlled fiber spacing.
   d) Particle size distributions for controlled fiber spacing and particle packing efficiency.
   e) Polymer fibers commingled with reinforcement fibers for controlled resin content
   f) Commingled polymer fiber size for controlled spacing of reinforcement fiber.
   g) Commingled polymer fiber size distributions for controlled spacing of reinforcement fiber and polymer fiber packing efficiency.
   h) Hybrid combinations (type and size) of particles and polymer fibers for placement within a layer or as an interlayer.
5) "Scrim" variants of aligned discontinuous fiber thin ply sheets and tailored blanks:
   a) Scrim material for material handling.
   b) Thermoplastic scrims producing net resin ply material.
   c) Thermoset scrim/interlayer toughening scrim layers.
   d) Thermoset scrim b-stage/net resin layers.
6) Material forms comprised of coated aligned discontinuous fibers:
   a) Aligned discontinuous fiber preforms with coated fibers, where the coating can be and is not limited to polymer, metallic or ceramic.
   b) Aligned discontinuous fiber preforms with coated fibers, where the coating can be a multi-layer system comprised of variants in 5(a).
   c) Aligned discontinuous fiber preforms with coated fibers, where coating thickness is highly uniform, enabling controlled fiber-to-fiber spacing.
   d) Aligned discontinuous fiber preforms with coated fibers, where polymer coating thickness is selected based on desired resin content.
   e) Aligned discontinuous fiber preforms with coated fibers, where the coating is a thermoplastic selected for toughening thermoset composites, and thickness selected based on the optimal toughness desired.
   f) Aligned discontinuous fiber preforms with coated fibers with all possible combinations of fiber and dry preform variants in (1) and coated fiber variants in 1(a) to 1(e).
   g) Aligned discontinuous fiber preforms with coated fibers in combination with all polymer particle approaches mentioned, above in 3.
7) Additive manufacturing: source material for Fused Deposition Modeling (FDM) with high volume fraction embedded aligned discontinuous fibers:
   a) Applicable to all of the aligned discontinuous fiber formats discussed above, including coated fibers and mixtures with particulates.
   b) Ultraviolet (UV) cure thermoset materials may be particularly useful for additive manufacturing.
8) Steerable thin ply material forms for tape placement (both thermoplastic and thermoset)
   a) Applicable to all of the aligned discontinuous fiber formats discussed above
9) Thin ply sheets and blanks
   a) All variants of discontinuous fibers, polymers (dry, particles, coating).
   b) Zero/minimal waste/recycling/reuse of discontinuous fibers.
   c) Tailored laminates in minimal gage thickness and maximum number of layers (enables minimal angle changes between layers leading to improved properties).
10) Net shape manufacturing
   a) Net shape patterns in sheet form.
   b) Net shape blanks with zero/minimal waste/recycling/reuse.
   c) Net shape tailored laminates in minimal gage thickness and maximum number of layers (enables minimal angle changes between layers leading to improved properties).
11) Formable feedstock
   a) Resulting embodiments can be formed like sheet metal due to in-plane biaxial stretch of at least 40% without loss of microstructural integrity.
   b) Resulting embodiments can be formed like sheet polymer.
   c) Resulting embodiments provide in-plane deformation (extension and shear) within single layers and multi-layer blanks.
   d) Resulting embodiments can form double curvature complex geometry parts without wrinkles or darting and form into very tight radius.
   e) Resulting embodiments have tailorable forming characteristics, for example by changing fiber length and/or fiber volume fraction within a layer, layer thickness and stacking sequence.

The above outlines, rather broadly, some of the features of certain aspects of the invention so that the detailed description thereof may be better understood, and so that the present contribution to the art may be better appreciated. Additional features of certain aspects of the invention will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

Other advantages of embodiments of the present invention will become obvious to the reader. To the accomplishment of the above, aspects of this invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

Aspects of the invention are best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale. On the contrary, the dimensions of the various features may be expanded or reduced for clarity. Included in the drawings are the following figures.

DETAILED DESCRIPTION OF THE INVENTION

Figure 1:
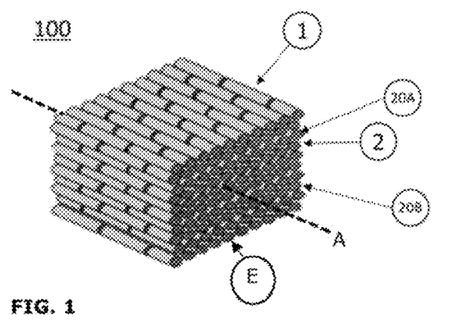
FIG. 1 is a schematic showing the discontinuous fiber microstructure with aligned fibers in an array that defines a ply within a binder or net resin matrix.

Described hereinafter is a method and apparatus for aligning discontinuous fibers to create a composite material. FIG. 1 is a schematic showing a composite material 100 comprising a discontinuous fiber microstructure with aligned fibers 1. The composite material 100 contains a plurality of horizontally-oriented layers 2 of fibers 1. Each layer 2 comprises an array of fibers 1 that defines a single ply within a binder or net resin matrix. The fibers 1 in each array are tightly aligned in adjacent rows. Each row of the array contains a plurality of fibers 1 abutted together in an end-to-end fashion along an axis A. Each row has at least one free and un-cut edge E that extends perpendicular to axis A. The composite material 100 has two un-cut edges E that are disposed opposite one another. According to one aspect of the invention, the majority, more preferably at least 95 percent, of the fibers 1 in each row are aligned non-parallel (e.g., perpendicular or at an acute angle) to an axis extending along the edge E.

Figure 14:
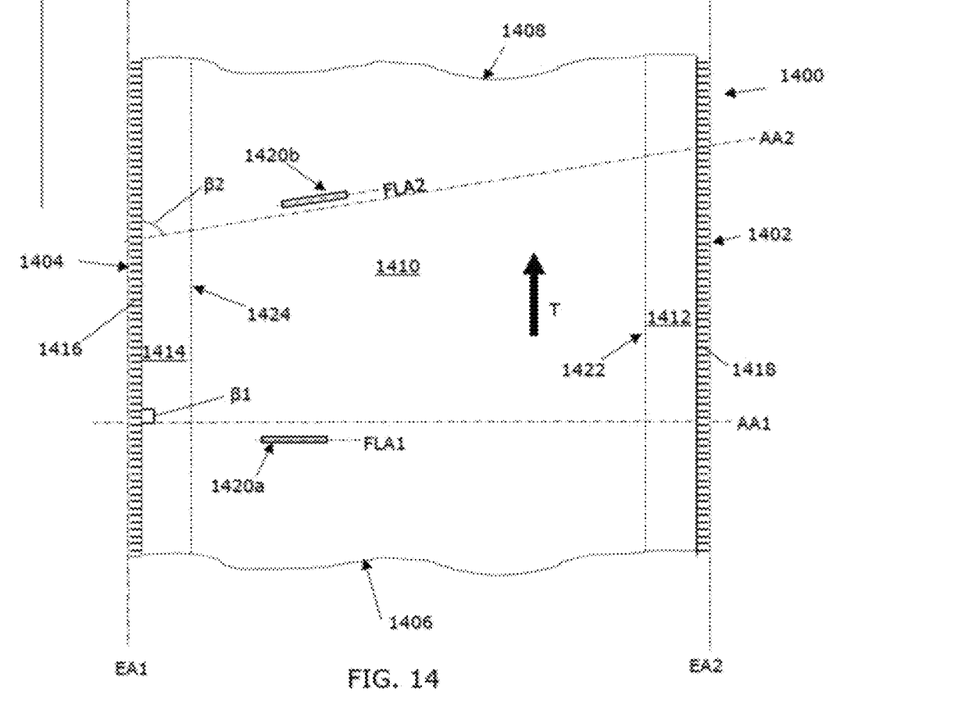
FIG. 14 depicts a schematic plan view of an exemplary composite material.

As further depicted in FIG. 14, composite 1400 comprises edges 1402 and 1404 aligned along edge axes EA1 and EA2, respectively, which are aligned parallel to the axis of travel T of the belt on which the composite was formed. Dashed lines at the trailing 1406 and leading 1408 ends as depicted in FIG. 14 are intended to show that the composite may continue in the direction of travel indefinitely, until cut, which cut may be perpendicular to the edges or at any angle or in any curved or linear configuration desired. In at least one longitudinal section of the composite, each fiber 1420a has a longitudinal fiber axis (FLA1). As discussed above, embodiments of the process permit up to 95%±5% of all fiber axes FLA1 to be aligned with a desired alignment axis AA1, As shown in FIG. 14, AA1 is perpendicular to edge axes EA1 and EA2 (i.e. β1=90 degrees) and to the direction of travel T. As further discussed herein, however, the process may be manipulated to provide for a first alignment axis (AA1) that has a first non-parallel angle (β1) to the edge axis along a first length, and a second alignment axis (AA2) that has a second non-parallel angle (β2) to the edge axis along a second length of the composite, wherein β1 is not equal to β2. Thus, a resulting composite may have a first section in which the longitudinal axes (FLA1) of the majority (e.g. at least 95%) of the fibers 1420a are aligned (e.g. within ±5%) to a first alignment axis (AA1) and a second section in which the majority of the longitudinal axes (FLA2) of the fibers 1420b are aligned to a second alignment axis AA2.

It should be understood that some composites may comprise all fibers in the composite aligned to a single axis AA1 that is perpendicular to the edge axes, or all fibers aligned to a single axis AA2 that is disposed at an acute angle to the edge axes, whereas others may comprise a continuous sheet having a first portion aligned with AA1 and a second portion aligned with AA2. In such a continuous sheet, a portion intermediate the first and second portions has fibers aligned at angles between AA1 and AA2 along a gradient from AA1 to AA2 along the distance between the alignment axes.

As an artifact or signature of some embodiments of the process, bands 1412, 1414, 1416, 1418 comprising a different (relatively greater relatively lesser) areal density (i.e. number of fibers per square unit of measure) of fibers is formed adjacent each free edge 1402, 1404 relative to the areal density in a central region 1410 of the composite. Thus, some composites may have a first areal density in a central region 1410 of the composite material and a second areal density at a free, uncut edge of the composite 1402, 1404 different than the first areal density. Furthermore, a gradient of areal densities between the central region and the uncut edge may be formed in which the areal density changes in the direction of the edge. The gradient may be limited to one or more distinct bands or regions 1412, 1414, 1416, 1418 that extends a limited distance from the free edge toward the central region, as depicted in FIG. 14 by the inner dashed lines 1422, 1424 that form the boundaries of regions 1412, 1414 and that are parallel to edges 1402 and 1404. As depicted in FIG. 14, bands 1412, 1414 have a relatively greater density than the central region 1410, and bands 1416, 1418 have a relatively lesser density than the central region 1410. Bands 1412,1414, 1416, 1418 are preferably cut off (i.e. along lines 1422, 1424 or lines substantially parallel to and further from the adjacent edges) from the dry fiber mat formed on the veil and recycled back into the fiber alignment process. Thus, the resulting composite preferably comprises only the central region in which the areal density is relatively consistent within a desired tolerance from edge to cut edge. Thus, intermediate fiber mats disposed on the veil may have a signature characteristic at the uncut edges comprising the subject band. It should be understood that the invention is not limited to composites having such a configuration, and that some embodiments of the method may minimize or avoid creating a differential in areal density between a central portion and the edge. In particular, process improvements may eliminate areas (e.g. 1412, 1414) of relatively greater areal density adjacent the edges, but at least some areas (e.g. 1416, 1418) of relatively lesser areal density are expected to persist at the very edge.

Referring back to FIG. 1, the longitudinal axes of the fibers 1 in each row are substantially aligned with one another along the axis A. The stiffness of the composite material 100 is a direct function of the degree of alignment between the fibers 1. The degree of alignment of each fiber 1 along axis A may be nearly perfect, as shown, or the angle of each fiber 1 with respect to the axis A may vary between zero to 5 degrees, for example and according to one aspect of the invention. As used herein, an alignment characterized as "95 percent plus or minus 5 percent" (95%±5%), means that 95% of the fibers in each row are aligned within 0 to 5% of the alignment axis. It should be understood that although the methods described herein, when optimized for alignment quality, are capable of achieving such alignment, the methods may also be optimized for throughput speed or lowest cost, and that lesser degrees of alignment may still represent an appreciable advantage over prior art methods for the same throughput and/or cost. Even when not optimized for alignment quality, however, the process tends to produce composites in which the majority (e.g. at least 50%, preferably more than 75%, more preferably more than 90%, optimally at least 95%) of the fibers are aligned to the alignment axis within a predetermined tolerance (e.g. within 15%, more preferably within 10%, most preferably within 5%) as dictated by the needs of the process. The invention is not limited to any particular level of optimization, however, as utilization of the process to produce composites with less than a majority of fibers aligned to the alignment axis with a comparatively wider tolerance than that noted above (but still having some detectable preferential alignment relative to a random distribution of fiber orientations) may be capable of very rapid production using embodiments of the process as described herein, and may exhibit notable physical characteristics superior to, for example, composites formed from randomly oriented fibers having no detectable preferential alignment.

The individual fibers 1 preferably have a length-to-diameter aspect ratio of at least one hundred, for example. The use of relatively discontinuous fibers permits the creation of intricate composite structures having sharp corners and bends. The length-to-diameter aspect ratio can vary. The fibers 1 can be formed from any material, such as metal or carbon fiber, for example, or any other material known to those skilled in the art. Different fiber types can be comingled together in a composite material. For example, one layer 20A may comprise metal fibers, whereas another layer 20B may comprise carbon fibers. Alternatively, the fiber material within each layer 2 may vary.

Figure 2A:
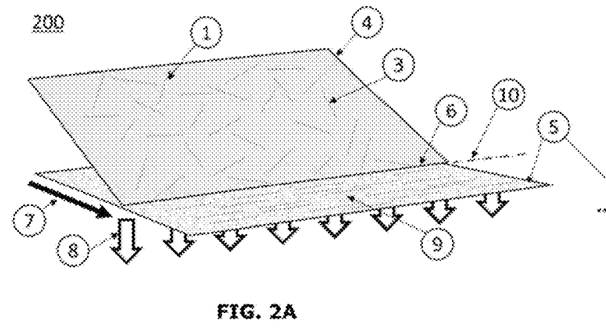
FIG. 2A depicts an isometric view of a fiber alignment system, according to a first exemplary embodiment.
Figure 2B:
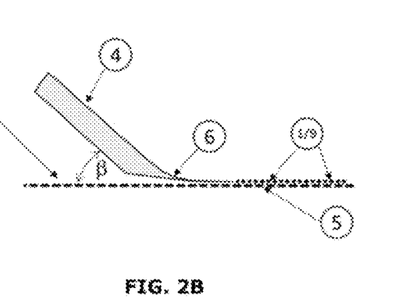
FIG. 2B depicts a side elevation view of the fiber alignment system of FIG. 2A.

FIGS. 2A and 2B depict a fiber alignment system 200, according to a first exemplary embodiment, for producing a composite material like that shown in FIG. 1. The system 200 includes a planar and slanted free surface 4 oriented at an angle β with respect to the deposition surface for the fibers, which is a porous carrier belt 5 disposed on a horizontal plane. As shown, an entirety of the free surface 4 is positioned at an elevation above the belt 5. The angle β may be less or greater than 55 degrees, for example. The end 6 of the slanted surface 4 may be sloped or curved from the edge of the plane formed by the slanted surface 4 to the location where the fluid mixture discharges to the belt 5 to reduce the incidence angle of the impinging water on the belt surface and to create a low impingement angle, as best shown in FIG. 2B. The end 6 may be a concave surface that faces away from the belt 5. The end 6 of the slanted surface 4 may be integrated with the slanted surface 4, or the sloped end 6 may comprise a thin plate or shim (e.g., 1 mm thick steel plate), for example, mounted to the end of the slanted surface 4. The slanted surface 4 may be treated or coated to produce a hydrophilic surface that thins the fluid-fiber mixture flowing down the slanted surface 4, as will be described later.

The belt 5 is preferably oriented parallel to a horizontal plane. The belt 5 is attached to a motor (not shown) for moving the belt beneath the slanted surface 4. A vacuum source (not shown) is positioned beneath the belt 5. The airflow distribution is controlled to stabilize the deposited fibers upon deposition. The end 6 of the slanted surface 4 may bow as a result of the vacuum force.

In operation, a fluid mixture comprising the fibers 1 interspersed throughout a carrier fluid is discharged from the discharge ends 11 (e.g. nozzle or series of nozzles) of a carrier conduit, preferably in laminar flow at the nozzle exit, and cascades down the slanted surface 4 towards the belt 5 as a free surface thin film. Although not shown in FIGS. 2A and 2B, a conduit positioned at the top end of the slanted surface 4 may introduce the fluid onto the slanted surface 4. Upon impingement on the belt 5, any misaligned fibers 1 in the carrier fluid rotate and align along the axis of impingement As the fibers 1 travel over the bottom edge of the sloped surface 6, the fibers decelerate and are rotated by fluid forces to align with the predeposited fiber network along the axis of impingement 10. In other words, the fibers 1 are aligned in a row 9 on the belt adjacent and substantially parallel to other rows 9, as shown.

The fibers 1 within the thin plane of fluid are aligned by default within the carrier fluid 3 and planar to the slanted surface 4 due to the physical constraints of the slanted surface 4 and the free surface tension that overcomes release of the fiber 1 from the fluid domain. The free surface of the slanted surface 4 also minimizes the possibility of fiber clumping or blockage during deposition.

Stabilization of the fibers falling into the axis of impingement 10 is achieved using localized vacuum 8, which removes the carrier fluid. The vacuum 8 draws the carrier fluid (but not the fibers 1) through the porous belt 5. The vacuum 8 also prevents subsequent fiber motion in the aligned row 9 of fibers 1. Control of the fiber concentration within the carrier fluid and adequate dispersion ensures that the fibers 1 falling toward the belt 5 are unimpeded from landing on the material 18 by neighboring fibers and achieve the desired level of alignment. The flow speed of fluid mixture 3 is significantly higher than the speed of the belt 5 so that fiber alignment is maintained on the surface of the belt 5 during the rotation phase. The flow speed may be controlled by, for example, a metering pump, the distance of the nozzle 11 from the belt surface 5, the viscosity of the carrier fluid and the angle of the slanted surface 4. The speeds of the belt 5 and the fluid mixture can be adjusted to meet any desired density of the aligned fibers. The areal weight of deposited fibers 1 is governed by the fiber concentration within the carrier fluid, the thickness and velocity of the fluid on the sloped surface 4, and the speed of the belt 5. The flow rate and control of air flow below the porous belt 5 at the vacuum location 8 also affects the free surface fluid shape at the axis of impingement 10.

The porous belt 5 continuously moves in direction 7 thereby making room for the deposition of more rows 9 of fibers 1. In this configuration, the row 9 of fibers 1 are aligned along the axis of impingement 10, which is orthogonal to the belt travel direction 7. This process is continuously repeated to form a plurality of rows 9 of fibers 1. The group of rows 9 comprises a single layer 2 of fibers 1.

FIGS. 3A and 3B depicts another fiber alignment system 300, according to a second exemplary embodiment. The fiber alignment system 300 of FIGS. 3A and 3B is similar to the fiber alignment system 200 of FIGS. 2A and 2B and only the differences between will be described.

In the fiber alignment system 300 of FIGS. 3A and 3B, a conduit or series of conduits 11 introduce the fluid mixture 3 containing fibers 1 and a carrier fluid onto the slanted surface 4. Each conduit 11 may have a nozzle at its distal end adjacent the slanted surface 4. The conduits 11 are oriented at an angle γ with respect to an axis 15 that is normal to the plane of the slanted surface 4. The angle γ represents the conduit angle with respect to the slanted surface 4, expressed as the differential from an angle normal to the slanted surface. Maintaining angle γ at a relatively large angle (as shown) reduces the time that the fluid mixture 3 can travel down the slanted surface 4 because the fluid mixture 3 is expelled from the conduits 11 at a location closer to the belt 5. Conversely, maintaining γ at a relatively small angle increases the time that the fluid mixture 3 can travel down the slanted surface 4 because the fluid mixture 3 is expelled from the conduits 11 at a location further from the belt 5. The angle γ may be adjusted to accommodate a particular fiber type used in the system 300.

The slanted surface 4 as depicted in FIG. 3A is rotated by an oblique angle 13 of theta (Θ) with respect to a belt width axis 14. The belt width axis 14 is orthogonal to the travel axis 12 of the belt 5. By virtue of the angle Θ of the slanted surface 4, the fibers 1 are oriented along an axis of impingement 10 that is neither perpendicular to the travel axis 12 of the belt 5 nor parallel to the belt width axis 14. Angle Θ of the slanted surface 4 may be 5, 10, 20, 30 or 40 degrees, for example, but is not limited to any particular angle (and angle Θ may also be 0, resulting in an embodiment like that shown in FIG. 2A). This feature of the system may be useful for producing a fiber microstructure having fibers 1 of one layer 2 that are oriented at a different angle relative to axis A than the fibers 1 of another layer 2 of the fiber microstructure. This allows for production of continuous off-axis aligned material that reduces scrap material and the need for splicing off-axis layers when creating a laminate structure.

The flow rate of the fluid mixture and the aforementioned angles Θ, β, γ may be adjusted to tailor the system 300 to the particular properties of a fiber and/or composite structure. For example, the optimal thickness (viscosity) of the fluid mixture, the mass flow rate of fluid mixture 3, the angle β of the slanted surface 14, the angle γ and position of the conduits 11 with respect to the slanted surface 4, and the surface energy of the slanted surface 4, all are variables that may be adjusted to provide optimum flow behavior. Also, adjustment of areal weight (the weight of fiber per unit area) and layer width are additional variables that may impact selection of the process parameters.

FIG. 4 depicts a side elevation view of a fiber alignment system 400, according to a third exemplary embodiment. The fiber alignment system 400 is similar to the fiber alignment system 300 of FIGS. 3A and 3B and only material differences there between will be described.

The system 400 is a scaled-up version of the system 300 for producing a hybrid material (like item 100) having multiple fiber layers 2 (three shown, but not limited to any number of layers). The fiber alignment system 400 includes a plurality (one for each layer desired) of the systems 300 of FIGS. 3A and 3B, which are identified as systems 300*a*, 300*b* and 300*c*, and referred to collectively as systems 300, for producing the multiple layers 2. The systems 300 are arranged side by side (i.e., one in front of another) above a single belt 5.

A carrier substrate 18, in roll form, is positioned upstream of the systems 300. The carrier substrate 18 may be a porous polymer matrix veil, a polymer film, or a non-woven web of neat polymer scrim material, for example. During operation, a web of the carrier substrate 18 is unrolled onto the belt 5 to a location downstream of the slanted surfaces 4 prior to distributing the fluid mixture (at each system) onto the slanted surfaces 4 so that the layers 2 are positioned upon the carrier substrate 18 and not the belt 5. A series of vacuum ports 8 are positioned beneath the porous belt 5. Each vacuum port 8 (see arrows) is aligned with the impingement axis 10 (i.e., below the bottom end of the slanted surface 4) of one of the systems 300.

A covering material (not shown), also in roll form, may be positioned downstream of the systems 300 to form a cover over the carrier substrate and the fibers deposited thereon. With the covering binder in place, the carrier substrate, fibers, and covering binder may be rolled together into a single roll, which allows for easier transport to a next step in the process. While not limited to any particular materials, polyetherimide (PEI) may be particularly well suited for use as a carrier substrate, and an anti-static polymer film may be particularly well suited to serve as the covering material.

The carrier substrate 18 is placed prior to fiber deposition to allow transfer of the aligned fiber to a consolidation process or fused in as part of a preform stock material. This system also allows for a combination of non-woven web support with infused particles as a method of adding resin to the fiber bed. Target fiber volume fraction is achieved by controlling the ratio of deposited fibers to scrim and/or particle content filtered within the fiber bed.

Figure 3A:
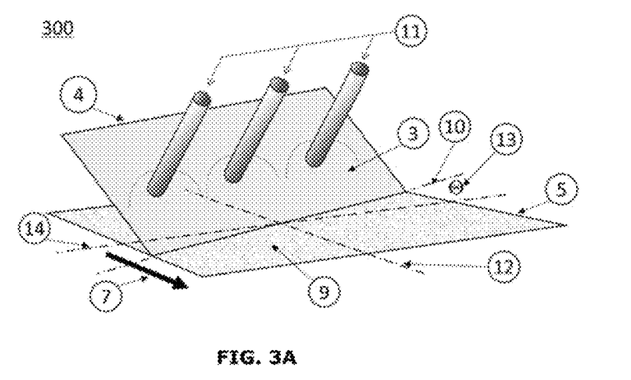
FIG. 3A depicts an isometric view of a fiber alignment system, according to a second exemplary embodiment.
Figure 3B:
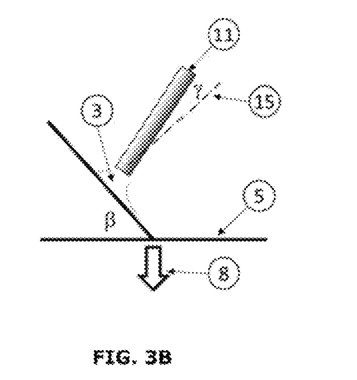
FIG. 3B depicts a side elevation view of the fiber alignment system of FIG. 3A.

Each system 300 can introduce a unique fluid mixture comprising a carrier fluid, fibers 1 and (optionally) particles. The fluid mixture 16 expelled from the conduit 11 of the system 300b can differ from the fluid mixture 17 expelled from the conduit 11 of the system 300b. By way of example, a stabilizing polymer in the form of coated fibers or dispersed polymer particles may be introduced into one or more of the fluid mixtures. The individual fibers 1 may be coated with a polymer, for example, or any other coating that is known to those skilled in the art.

Figure 4:
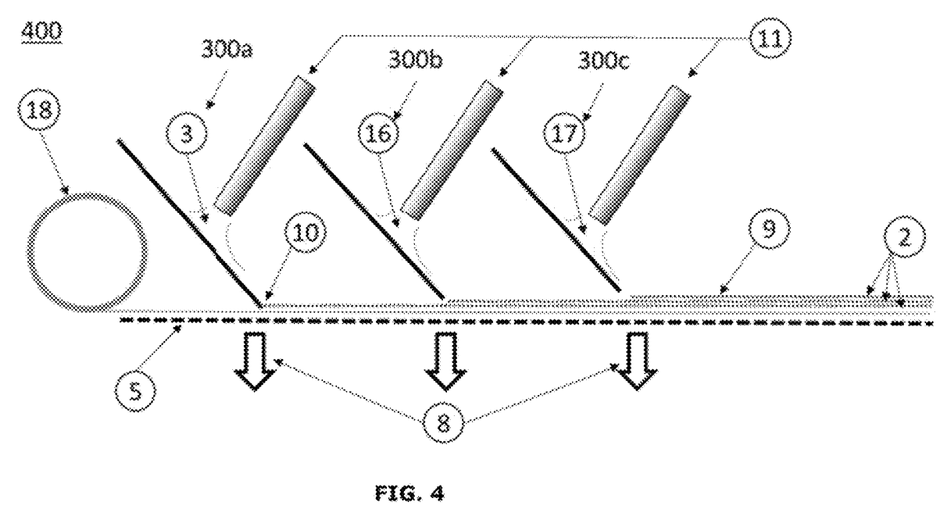
FIG. 4 depicts a side elevation view of a fiber alignment system, according to a third exemplary embodiment.

Scalability in ply thickness and production throughput is achieved with multiple layer deposition surfaces, as shown in FIG. 4. The fibers of each layer 2 added to the vacuum belt can be rotated with respect to the belt travel axis 12. More particularly, the slanted surfaces 4 may have different angles θ such that the axes of impingement 10 are not parallel with one another, thereby resulting in fiber layers of a composite structure that are oriented in different directions relative to one another (unlike the composite structure 100).

Polymer particles may be added to the fluid mixture 3, 16 and 17 and picked up on preplaced material to act as a binder source or net resin material that is fused or consolidated in place to produce the final ply architecture. Hybridization of the discontinuous fiber ply (or plies) can be achieved by mixing a variety of fiber materials on a per-layer basis.

Figure 5:
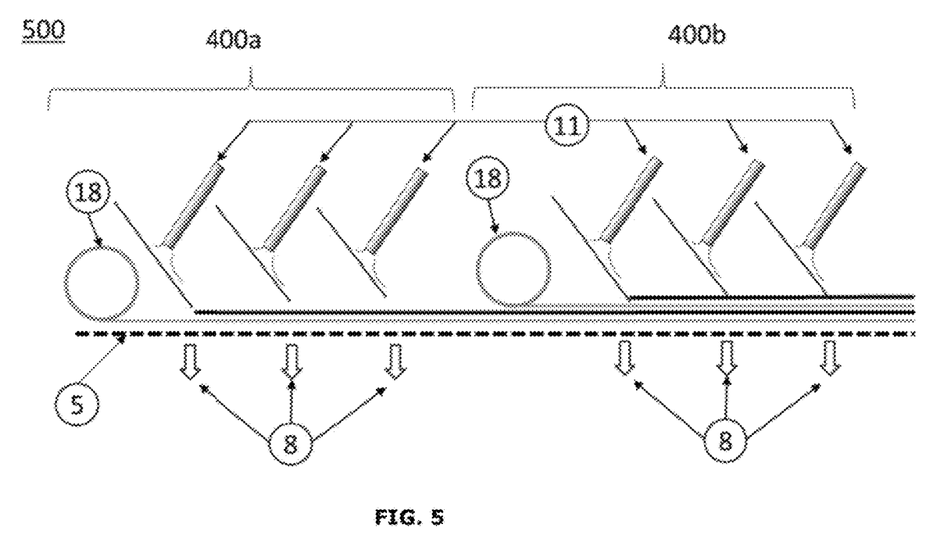
FIG. 5 depicts a side elevation view of a fiber alignment system, according to a fourth exemplary embodiment.

FIG. 5 depicts a side elevation view of a fiber alignment system 500, according to a fourth exemplary embodiment. The fiber alignment system 500 is similar to the fiber alignment system 400 and only the material differences there between will be described. FIG. 5 shows how the system of FIG. 4 is scaled up by incorporating multiple linear combinations of the system of FIG. 4 resulting in a customized fiber-polymer interlayer architecture in the form of a composite material 1100 shown in FIG. 11.

More particularly, the system 500 is a scaled-up version of the system 400 for producing a composite material having multiple fiber layers 2. The fiber alignment system 500 includes a plurality (two shown, but not limited to any number) of the systems 400 of FIG. 4, which are identified as systems 400a and 400b, and referred to collectively as systems 400, for producing the multiple fiber layers. The systems 400 are arranged side by side (i.e., one in front of another) above a single belt 5. In operation, the layers produced by the system 400b are disposed over the layers produced by the system 400a, and all of the layers are bonded together to form the composite 1100 shown in FIG. 11 (shown exploded).

Figure 6:
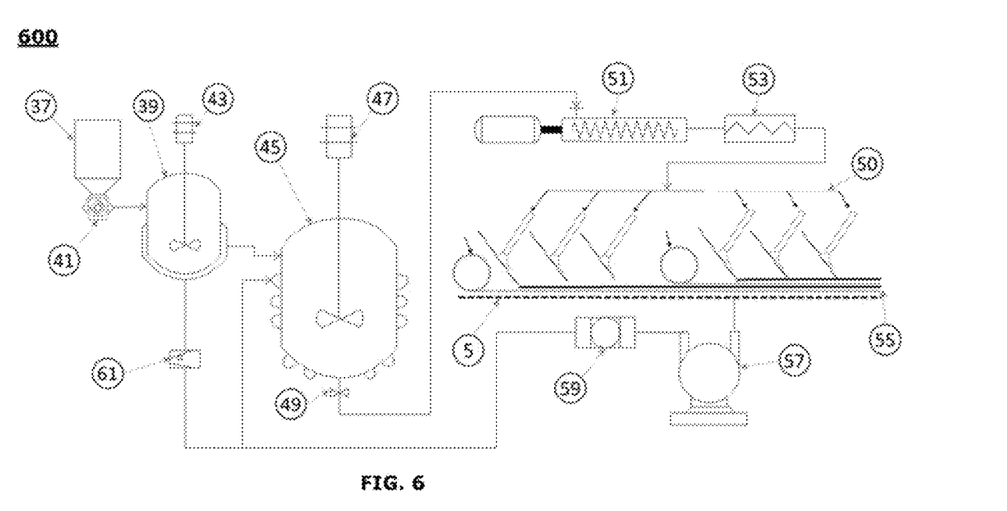
FIG. 6 depicts a side elevation view of a fiber alignment system, according to a fifth exemplary embodiment.

FIG. 6 depicts a side elevation view of a fiber alignment system, according to a fifth exemplary embodiment of the invention and including the system 500 of FIG. 6. FIG. 6 shows a schematic of an exemplary full process for discontinuous fiber alignment including material mixing, dispersion, pumping to the conduit array 11, followed by fluid withdrawal, recovery and recirculation to form a closed loop.

More particularly, dry discontinuous fibers 1 are introduced into a hopper 37 and dispensed into a mixing tank 39, which is filled with carrier fluid, such as via a gravimetric vibration system 41. Mixer 43, comprising at least one impeller attached to a shaft driven by a motor, disperses the fiber fluid mixture within the mixing tank 39. The fluid mixture is fed into a larger tank 45 with further addition of carrier fluid to the target via recirculation, to reach a desired fiber loading of the fluid. Further dispersion is achieved with one or more mixers 47. The use of smooth wall tanks and plumbing (e.g. stainless steel, PTFE lined, etc.) is preferred to reduce potential for clumping of material during mixing and transport. While not limited to any particular carrier fluid, water may be a preferred carrier fluid because of its low cost and toxicity. The mixture of carrier fluid and fibers may also include other additives, such as surfactants, adhesion promotors, fillers, and other matrix materials, such as powders or other types of particles, as described above.

Valve 49 in an open position feeds the fluid mixture into a pump 51, preferably a positive displacement metering pump, such as a metering slurry pump. The pump may be operated by a variable frequency drive. The fluid mixture then may pass into a sonicator 53 that is configured to apply sound energy to the fluid mixture to promote uniform fiber dispersion and separation within the fluid mixture. The fluid mixture then travels under gravity or pumping action by the pump 51 into the fiber alignment system 500. In particular, the fluid mixture enters the fiber alignment system 500 through the conduits 11, as described above.

The aligned fiber material 55 produced by the system 500 is dried and consolidated as a net resin thin-ply pre-impregnated or lightly tacked as a preform source material. The carrier fluid is removed via vacuum system 57 connected to a vacuum duct with one or more ports disposed beneath the belt 5 (only one port of which is shown, schematically). Vacuum system 57 shown schematically may comprise a vacuum pump, a gas/liquid separator upstream of the vacuum pump intake, and a pump system for receiving the carrier fluid separated from the air by the gas/liquid separator. The carrier fluid may then be pumped through a filter 59, which removes any residual fibers or particles that may have passed through the porous belt 5. A flow regulator 61 is used to control the volume of fluid that returns to both mixing tanks 39 and 45, to ensure correct fiber-carrier concentrations within each tank. A series of sensors are used throughout the process to monitor fluid flow parameters, fiber concentration, degree of dispersion, alignment quality and aligned fiber areal weight, as are known in the art. The process described herein may create an arrangement of fibers on the carrier substrate with unique qualities as compared to fiber layers produced by prior art processes, and can be spooled or rolled up for post-processing.

Figure 7:
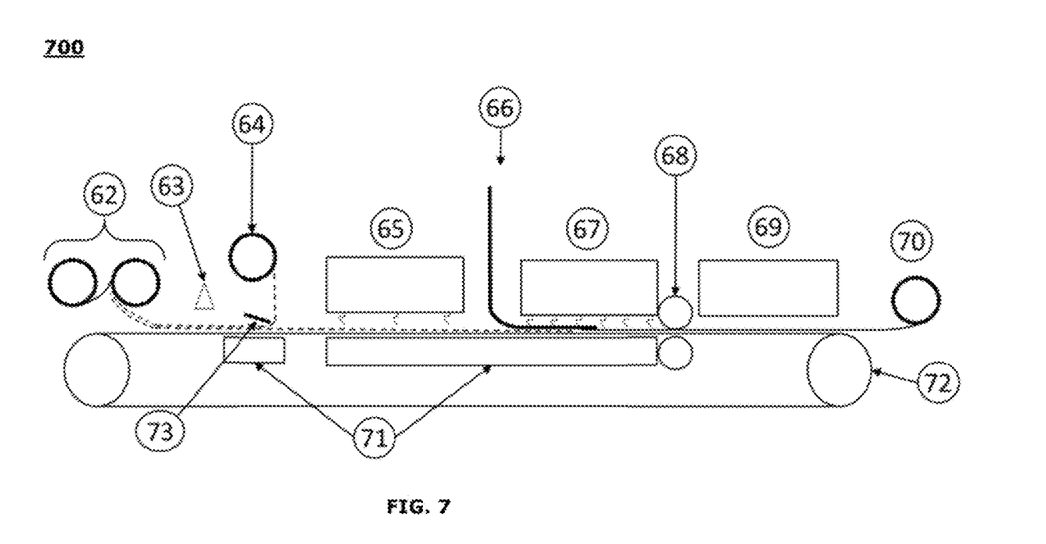
FIG. 7 depicts a side elevation view of a preform consolidation system, according to a first exemplary embodiment.

Aligned discontinuous fibers on a carrier substrate created by the various embodiments described herein, are processed into composite material forms by system 700. System 700 comprises of an infeed stage 62, carrier removal stage (63, 64 and 73), drying stage 65, polymer stage 66, heating and consolidation stages 67-69 and a take up stage 70. The infeed stage 62 comprises a spool of aligned discontinuous fiber on a carrier substrate, with an additional cover layer for handling to prevent distortion of the unique aligned discontinuous fiber architecture. Aligned discontinuous fiber spools can also be with different angles, such as a 90 degree roll or a 45 degree roll to create multi-angle stacks as desired. A conveyer stage 72 is preferred for material transfer within this embodiment, to minimize distortion of aligned discontinuous fiber architecture. The carrier removal stage includes the liquid-based misting stage 63, comb 73 and spool 64. The carrier removal process removes the cover layer, followed by removal of the carrier substrate through a combination of vacuum 71 to hold the fiber bed intact, while the carrier is peeled around a comb 73 and spooled up by a spool 64. An additional liquid-based misting stage 63 may be used to maintain integrity of the aligned discontinuous fiber layer during carrier removal process. A number of these stages (N) may be sequenced to increase the number of stacked aligned discontinuous fiber layers. The drying stage 65 in system 700 removes any left-over fluid in the aligned discontinuous fiber layers, prior to the heating and consolidation.

A polymer stage 66 is introduced in system 700 prior to the heating and consolidation stages 67-69, where the polymer is impregnated into the aligned discontinuous fiber stack to create the composite material form. The polymer may be a binder to stabilize dry preforms, thermoset or thermoplastic film with the thickness or areal weight that is matched to the areal weight of aligned discontinuous fiber stack to obtain the target fiber volume fraction. Heating 67 may be achieved by infrared, contact heating or similar methods, with pressure provided by either displacement or pressure controlled nip rollers 68. Temperatures, pressures and throughput in the heating and consolidation stage are governed by the selected polymer and well-understood by those familiar with polymer and composite material processing. For example, a temperature of 635 degrees Fahrenheit at pressures between 1 bar (through vacuum or otherwise) and/or nip roller pressures ranging from 1 bar to 20 bar, with throughputs of up to 5 ft/min may be used for PEI thermoplastic film and aligned discontinuous carbon fiber. The heating and consolidation stage also includes a cooling stage 69 to reduce temperature of the impregnated composite form prior take-up and handling. This may be accomplished by a number of options including chilled nip rollers, air convection or more controlled air knives. The take-up stage 70 winds up the impregnated aligned discontinuous fiber multilayer system into roll form for further processing and is similar to conventional composite prepreg material form, with a unique discontinuous fiber architecture. Appropriate backings or carriers can be used for the thermoset form, as is standard practice in the industry.

Figure 8:
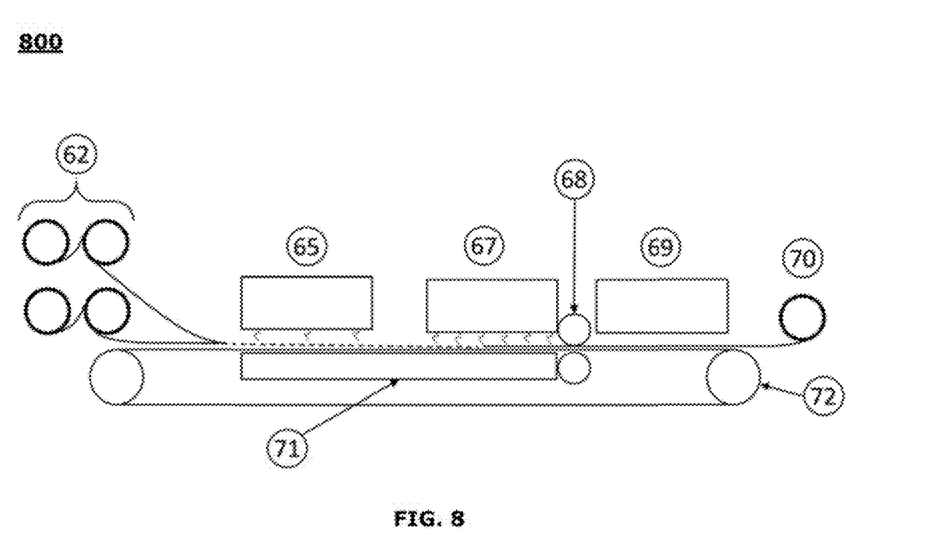
FIG. 8 depicts a side elevation view of a preform consolidation system, according to a second exemplary embodiment.

A second embodiment of system 800 in FIG. 8, includes the selection of carrier substrate to be the same as the polymer of choice in the composite form, or uses the carrier substrate to stabilize and create dry aligned discontinuous fiber preforms. This embodiment eliminates the carrier removal stage as well as the polymer film. For scenarios where the carrier substrate represents the final polymer of choice, the carrier substrate and aligned discontinuous fiber areal weight ratios can be selected to obtain the desired fiber volume fraction in the composite form. For stabilization of the aligned discontinuous fiber preform, the carrier substrate polymer is selected for compatibility to the final structural polymer, and areal weight in a range sufficient to stabilize the aligned preform without partial or full impregnation. In this embodiment, the infeed system 62 carries the spools of aligned discontinuous fiber after alignment, and after removal of the cover layer, the carrier and aligned fiber combination is dried, heated and consolidated as described previously, followed by take up.

Figure 9:
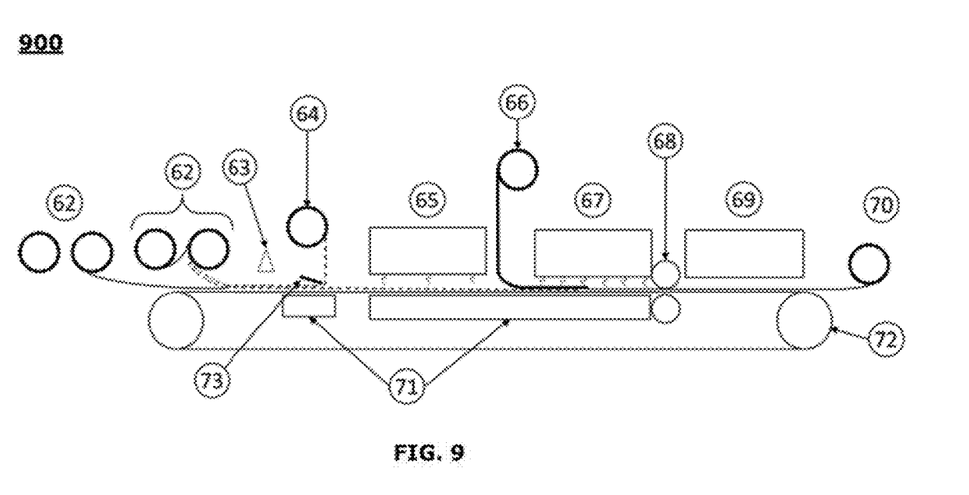
FIG. 9 depicts a side elevation view of a preform consolidation system, according to a third exemplary embodiment.

A third embodiment of system 900 in FIG. 9 is a combination of the previous two embodiments, in which the carrier may or may not be removed for multiple aligned discontinuous fiber rolls and combined with polymer film introduction, to achieve the desired fiber volume fraction in composite form. This approach may allow finer control of the fiber volume fraction, based on limits of the carrier and discontinuous fiber areal weight that may be possible.

Figure 10:
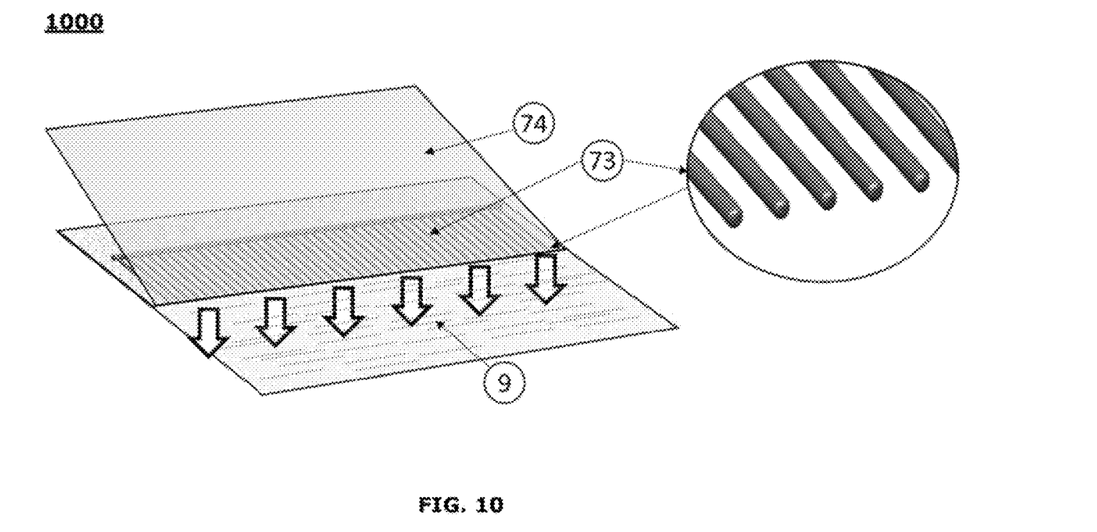
FIG. 10 depicts an isometric view of a carrier removal device for stacking highly aligned discontinuous fiber layers.

FIG. 10 depicts a carrier removal system for use with the system 700, for example. The mechanism of carrier removal while maintaining the highly aligned discontinuous fiber architecture is of particular desirability in system 700 and its associated variants. Removal of the porous carrier 74 from the highly aligned discontinuous fiber layer is facilitated by continuous airflow through the material form due to a vacuum (71) to keep the fiber structure intact. Mechanisms to remove the porous carrier optimally do not inhibit airflow, and allow removal of the porous carrier without distortion. One example is shown in FIG. 10, using a metal comb 73. Optimally, the spacing in the metal teeth of the comb are large enough to minimize airflow disruption and the diameter of the individual teeth are large enough to prevent distortion and catching of the porous carrier. Alternate methods may be used that facilitate desirable airflow without undesirable carrier distortion.

Other embodiments of system 700 may include individual systems configured to perform tasks of each of components of system 700, with material transfer between them, and are all included herein.

Composite material forms produced by system 700 and its various embodiments can be processed into complex composite articles through standard processes familiar to those with experience in the art. Examples include but are not confined to prepreg formats for processes including autoclave, tape placement, forming and its variants, out-of-autoclave processing; and dry stabilized formats that can be processed by vacuum, low and high-pressure resin infusion methods. The unique discontinuous fiber architecture developed in the alignment processes and maintained throughout the heating and consolidation and creates composite material forms with a unique combination of mechanical performance and formability.

Embodiments of this invention offer a new source material comprised of aligned and stabilized discontinuous fiber material for the production of composite structures. Exemplary alignment method embodiments provide for control of aerial weight enabling highly aligned thin ply tow, tapes, sheets and blanks that can further improve mechanical properties and weight savings especially for applications that are limited by the thickness of commercially available materials. Exemplary process embodiments offer a new class of thin ply composites applicable for critical parts by reducing the minimum part thickness within the consumer electronics industry, space, automotive and military, medical and biological sciences, aerospace as well as the all other consumer product markets. Lower cost and recycled fibers aligned with exemplary embodiments of the disclosed process are applicable to larger volume industries such as automotive, sporting, marine and the infrastructure industry.

Achievable alignment quality is the major driver of performance in discontinuous fiber composites. Highly-aligned systems enable high fiber volume fractions by allowing fibers to nest better and compact during composite manufacturing. As a result, fiber volume fractions as high as 63% have been achieved for the first time, equal to and higher than high-performance continuous fiber composites such as IM7/8552 used to manufacture aerospace structures.

According to one non-limiting example of the invention, the systems and processes described herein enable creation of discontinuous fiber composites comprising 5-7 micron diameter carbon fibers having an average length in the range of 1-7 mm, more preferably in the range of 3-6 mm (i.e. length-to-diameter (L/D) ratio range 600-1200), with fiber volume fractions (FVF) greater than 50%, and more preferably greater than 60%, with an alignment of 95%±5% or better. Such composites have demonstrated a tensile modulus greater than 20 msi, more preferably greater than 25 msi, and a strength greater than 300 ksi, more preferably greater than 350 ksi. It should be understood that the discontinuous fiber composites described above are not limited to any particular dimensions, values, measurements or material properties. In particular, it should be understood that while the processes described herein permit very high material qualities suitable for applications requiring such quality, processes may also be utilized to intentionally create composites with lesser FVF and lesser degree of alignment or may be optimized to create composites exceeding the qualities reported herein.

Figure 11:
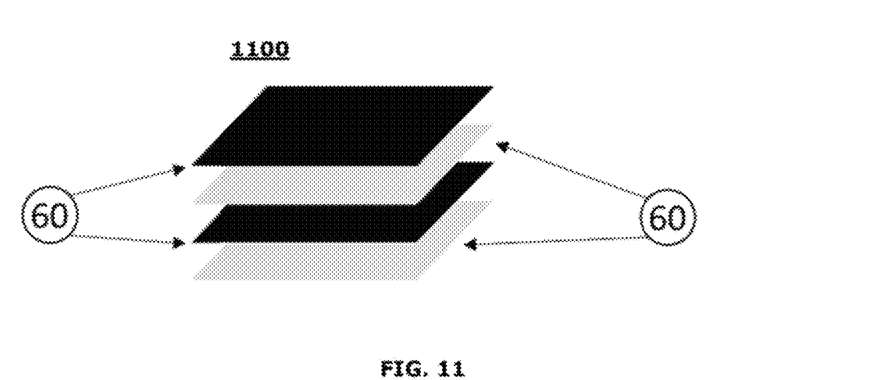
FIG. 11 depicts a composite material, which is shown exploded for clarity, produced by the fiber alignment system of FIG. 5 and preform consolidation system of FIG. 7.

FIG. 11 depicts a composite material 1100 (shown exploded) produced by the system 500 of FIG. 5 and system 700 of FIG. 7. The material 1100 comprises different layers sandwiched together and arranged in the desired order based on the properties of interest, and is familiar to those with experience in the art of composite material design and manufacturing.

Figure 12:
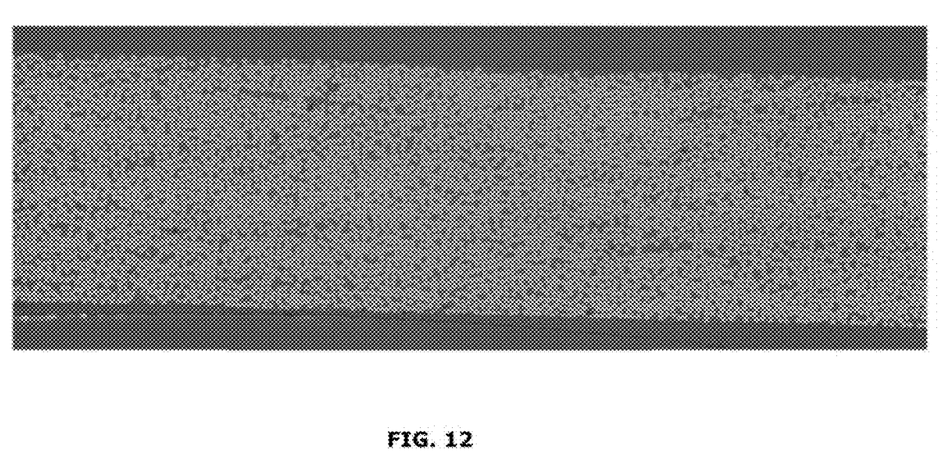
FIG. 12 depicts the cross-section microscope image of a composite material as depicted in FIG. 11, showing high fiber volume fraction (~63%) achieved through a high degree of alignment.
Figure 13:
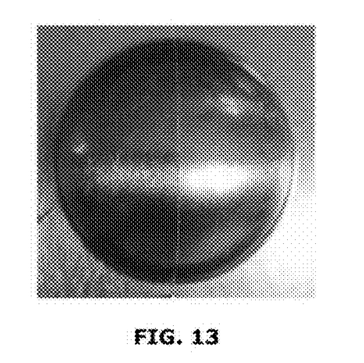
FIG. 13 depicts a hemispherical composite part formed with composite preforms from fiber alignment (FIG. 5) and preforming system (FIG. 7), demonstrating 40% bi-axial in-plane strain.

Composite materials manufactured from material forms created by the systems described herein, demonstrate material properties on par with continuous fiber composite systems depending on fiber characteristics (e.g. fiber length to diameter ratio greater than or equal to 1000). For example, discontinuous IM7 carbon fiber and PEI composites have demonstrated tensile modulus ~25 msi and tensile strengths exceeding 380 ksi at fiber volume fraction of 63%. FIG. 12 shows a cross-section image of demonstrated high fiber volume fraction (e.g., 63%) in a highly-aligned discontinuous fiber composites manufactured by the methods in this patent. High degree of alignment is shown by the lack of mis-aligned fibers (non-circular shapes). Composites with fiber lengths from 3 mm to 7 mm IM7 carbon fiber (aspect ratios from 600 to 1400) have also been demonstrated. The unique discontinuous fiber architecture enables extension in the fiber direction, with demonstrated in-plane extension in excess of 40% strain. Composite preforms with this architecture can be processed into tailored blanks and processed similar to sheet metal stamping. Uniaxial and bi-axial forming demonstrations have shown in excess of 40% stretch with aligned discontinuous IM7 carbon fiber and PEI composite blanks, while retaining continuous fiber equivalent mechanical properties. FIG. 13 shows a hemispherical composite part comprised of $[0_4/90_4/45_4/-45_4]_s$ quasi-isotropic blank manufactured with an exemplary process embodiment, demonstrating 40% bi-axial extension strain.

Figure 15:
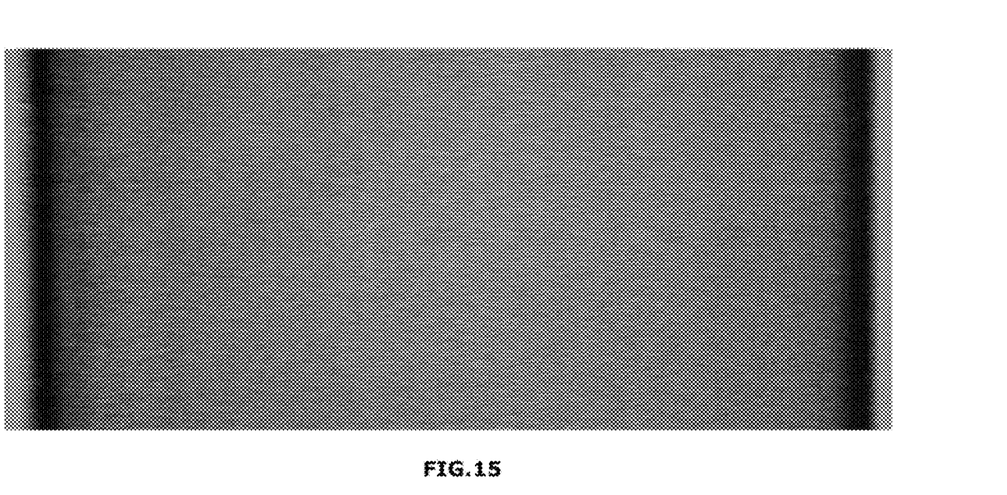
FIG. 15 depicts a top view image of the aligned fiber material showing process induced edge banding.

FIG. 15 depicts a top view light box image of the aligned fiber material on a veil carrier demonstrating uniform areal weight over the majority of the surface. Bands of relatively greater and/or relatively lesser areal density of fiber material may be present at the edges. Referring back to FIGS. 3A and 3B, the band of relatively greater areal density is caused in some embodiments by a hydraulic jump at the edge of the fluid domain resulting from nozzle impingement 11 on spillway surface 4. A band of relatively lesser areal density at the very edge is an expected artifact of most embodiments of the processes described herein. Although various optimizations to the process, such as by appropriate diversion of the fluid on the spillway surface 4, may minimize the difference in areal density and size of these bands, some difference in areal density (particularly at least the band of relatively lesser areal density) is expected to persist at the edges. Bands of greater and/or lesser areal density are preferably trimmed downstream of the fiber deposition process to recover the aligned fiber, and the recovered fiber recycled back into the process.

Comparative Examples

By contrast to some of the prior art processes discussed in the background section herein, embodiments of the process as disclosed herein are capable of creating a homogenous microstructure having uniform fiber lengths in the 3 mm range (and higher) for a 5-7 micron carbon fiber. Structures produced by embodiments of the inventive processes can facilitate rapid forming of complex geometries.

Some prior art disclosures relating to aligning discontinuous Standard Modulus carbon fibers (34 msi tensile modulus) with lengths as low as 3 mm with reasonable modulus translation but low strength translation. The Table below summarizes tension modulus and strength values for previously disclosed methods and structures as compared to the exemplary methods and structures as disclosed herein, sometimes referenced by the inventors as the Tailorable Universal Feedstock for Forming™ (TuFF™) method and resulting structures. The TuFF™ method has achieved the highest fiber volume fraction and has exhibited large improvement in composite performance, particularly in composite strengths, due to improved alignment quality. Equivalent properties to high performance continuous fiber prepregs (e.g. IM7/8552) have been demonstrated. See, e.g., Hexcel 8552 IM7 Unidirectional Prepreg 190 gsm & 35% RC Qualification Material Property Data Report, NCAMP Report: CAM-RP-2009-015 Rev A (describing properties of high performance continuous fiber prepregs).

Exemplary processes are also applicable to a wide range of fiber lengths (or aspect ratios), without limitation. Performance data for 3 mm and 6 mm composites using an exemplary TuFF™ method are shown in the Table below. Aligned preforms with discontinuous fiber lengths from 1-7 mm lengths have been demonstrated for IM7 carbon fiber, with measured performance shown for 3 mm and 6 mm fiber lengths. The degree of alignment refers to the percentage of fibers within ±degrees of the reference direction and was measured for the exemplary TuFF™ method by X-ray Computer Tomography from composites. The high degree of alignment drives an achievable fiber volume fraction (FVF) greater than 60%. Mechanical properties listed are for tensile properties (strength and modulus), with performance far exceeding values demonstrated in the literature. Composites using exemplary processes are thus capable of providing at least 95% of the fibers aligned within 5% of the alignment axis. As shown in the table below, such aligned composites comprising IM7 carbon fibers and PEI, may have a fiber volume fraction greater than 50%, a tensile modulus greater than 20 msi and a strength greater than 300 ksi. Embodiments with such alignment having a fiber volume fraction greater than 60% may have a tensile modulus greater than 25 msi and a strength greater than 350 ksi.

Tables Comparing Historical Alignment Methods and Composite Performance with Approach in this Patent

| Method | Year | Matrix | Fiber | Type | Length (mm) | Alignment | L/D | FVF % | Modulus (msi) | Strength (ksi) |
|---|---|---|---|---|---|---|---|---|---|---|
| IM7/8552 | — | Epoxy | Carbon | Prepreg | Continuous | — | — | 57 | 23.5 | 371 |
| TuFF ™ (IM7) | 2018 | PEI | Carbon | Fiber | 3 | ±5 (95%) | 600 | 63 | 25.1 | 387 |

-continued

| Method | Year | Matrix | Fiber | Type | Length (mm) | Alignment | L/D | FVF % | Modulus (msi) | Strength (ksi) |
|---|---|---|---|---|---|---|---|---|---|---|
| TuFF ™ (IM7) | 2018 | PEI | Carbon | Fiber | 6 | ±5 (95%) | 1200 | 52 | 20.9 | 358 |
| Centrifuge | 1980 | Epoxy | Carbon | Fiber | 3 | — | 425 | 55 | 17 | 176 |
| Disco | 1996 | PEI | Carbon | Fiber | 3 | ±14 (100%) | 425 | 50 | 14 | 159 |
| HiPerDiF | 2013 | Epoxy | Carbon | Prepreg | 3 | ±3 (80%) | 425 | 55 | 17 | 219 |
| Highform | 1987 | PES | Carbon | Fiber | 3.2 | ±5 (85%) | 450 | 49 | 14 | 145 |
| Glycerine | 1978 | Epoxy | Carbon | Tow | 3.2-12.7 | ±15 (95%) | 450-1800 | 50 | 4 | 42 |
| Vacuum Drum | 1980 | Epoxy | Carbon | Fiber | 2 to 4 | — | 280-570 | 55 | 15 | 174 |
| Vacuum Drum | 1985 | PI/PES | Carbon | Fiber | 3 | — | 425 | 55 | 13 | 138 |

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for aligning discontinuous fibers, comprising:
a porous belt having a direction and velocity of travel;
a free surface positioned above the porous belt and oriented at an oblique angle relative to the porous belt, the free surface having a proximal end adjacent the porous belt oriented along an impingement axis, wherein an entirety of the free surface is positioned at an elevation above the porous belt; and
a conduit having a discharge configured to distribute onto the free surface a fluid mixture including the discontinuous fibers dispersed in a carrier fluid, the discharge positioned to cause the fluid mixture to traverse the free surface in a film with gravity assistance toward the proximal end of the free surface,
the system configured to dispose the fibers aligned within a predetermined range of alignment with one another on the porous belt and the carrier fluid to pass through the porous belt.

2. The system of claim 1 further comprising a curved surface disposed at the proximal end of the free surface adjacent the porous belt.

3. The system of claim 2, wherein the curved surface is formed on a plate mounted to the free surface proximal end and is configured to dispose the fluid mixture onto the porous belt at a lateral or lesser oblique angle relative to the porous belt than the oblique angle of the free surface.

4. The system of claim 1, further comprising a roll of carrier substrate material positioned upstream of the free surface relative to the direction of travel of the porous belt, wherein the porous belt is configured to receive as a feed from the roll an unrolled first web of the carrier substrate material and to carry the unrolled web beneath the free surface and further downstream of the free surface, the carrier substrate material selected to receive the discontinuous fibers deposited thereon and to pass the carrier fluid there through.

5. The system of claim 4, wherein the carrier substrate material comprises a porous polymer matrix veil, a polymer film, or a non-woven web of polymer scrim material.

6. The system of claim 4, further comprising a roll of cover binder material positioned downstream of the free surface, the roll configured to feed an unrolled second web of the cover binder material to be disposed over the fibers deposited on the web of carrier substrate.

7. The system of claim 1, further comprising a plurality of free surfaces and a plurality of conduits, each conduit disposed relative to a respective one of the plurality of free surfaces.

8. The system of claim 7, wherein the plurality of free surfaces are oriented with respect to one another such that at least one respective axis of impingement is non-parallel to at least one other respective axis of impingement.

9. The system of claim 1, wherein the conduit is positioned at an oblique angle with respect to an axis normal to the free surface.

10. The system of claim 1, further comprising a supply of the discontinuous fibers.

11. The system of claim 1, wherein the porous belt has a travel axis aligned with the direction of travel and a porous belt width axis orthogonal to the belt travel axis, and the impingement axis is oblique to the belt width axis.

12. The system of claim 1 further comprising a vacuum port positioned beneath the porous belt, the vacuum port connected to a vacuum source and positioned to draw the carrier fluid through the porous belt and transport the carrier fluid away from an underside of the porous belt.

13. The system of claim 1 further comprising a sonicator connected upstream of the conduit discharge, the sonicator configured to apply sound energy operable to promote even dispersion and separation of the fibers in the fluid mixture.

14. A process for aligning discontinuous fibers using the system of claim 1, the process comprising:
distributing the fluid mixture, including the plurality of discontinuous fibers dispersed in the carrier fluid, onto the free surface from the conduit discharge to cause the fluid mixture to traverse the free surface in the thin film with the assistance of gravity toward the porous belt positioned beneath the free surface;
moving the porous belt in the travel direction; and
depositing the fluid mixture onto the porous belt from the free surface and causing the fibers to form a first layer of aligned fibers within the predetermined range of alignment along a first impingement axis and causing the carrier fluid to separate from the fibers and pass through the porous belt.

15. The process of claim 14, wherein the fluid mixture comprises a first fluid mixture including a first plurality of discontinuous fibers dispersed in a first carrier fluid and the free surface comprises a first free surface, the process further comprising distributing a second fluid mixture including a second plurality of discontinuous fibers dispersed in a second carrier fluid onto a second free surface positioned after the first free surface relative to the travel direction of the porous belt so that a second plurality of discontinuous fibers lands on the first layer of aligned fibers and along a second impingement axis, thereby forming a second layer of aligned fibers disposed above the first layer of aligned fibers.

16. The process of claim 15, wherein the first impingement axis is oriented at an oblique angle with respect to the second impingement axis.

17. The process of claim 14, further comprising positioning a substrate material on top of the porous belt and forming the first layer of aligned fibers on top of the substrate material.

18. The process of claim 15, further comprising positioning a first substrate material on top of the porous belt and forming the first layer of aligned fibers on top of the first substrate material and introducing a second substrate material above the first layer of aligned fibers after the first free surface and before the second free surface relative to the travel direction of the porous belt, and disposing the second layer of aligned fibers on the second substrate material.

19. The process of claim 14, wherein the distributing step comprises distributing the fluid mixture onto the free surface at an oblique angle with respect to an axis that is normal to the free surface.

20. The process of claim 14 further comprising sonicating the fluid mixture prior to distributing the fluid mixture onto the free surface.

21. The process of claim 15, wherein one of:
the second plurality of discontinuous fibers comprises a different type of fibers than the first plurality of discontinuous fibers;
the second plurality of discontinuous fibers comprises a different blend of fibers than the first plurality of discontinuous fibers;
the second carrier fluid comprises a different carrier fluid than the first carrier fluid;
the second free surface has a second angle relative to a belt travel axis that is different than a first angle of the first free surface relative to the belt travel axis; or
a combination thereof.

22. The process of claim 14, wherein the fluid mixture further comprises a plurality of particles dispersed in the first carrier fluid along with the plurality of discontinuous fibers.

23. The process of claim 15, wherein the first fluid mixture further comprises a plurality of first particles dispersed in the first carrier fluid along with the first plurality of discontinuous fibers, and the second fluid mixture further comprises a plurality of second particles dispersed in the second carrier fluid along with the second plurality of discontinuous fibers, wherein the second particles comprise a different material than the first particles.

24. The process of claim 14, further comprising providing a source of vacuum beneath the porous belt adjacent where the fluid mixture is deposited onto the porous belt from the free surface, and drawing the carrier fluid through the porous belt using the vacuum.

25. The process of claim 17, wherein the first layer of aligned fibers on top of the substrate material has a pair of opposite edges parallel to the travel direction and non-parallel to the first impingement axis, each aligned fiber having a longitudinal fiber axis, the longitudinal fiber axis of a majority of the fibers in the composite product aligned within a predetermined alignment tolerance to the first impingement axis.

26. The process of claim 25, wherein the first layer of aligned fibers has a first areal density in a first region located inward relative to the edges, and an areal density in edge regions adjacent each edge different than the first areal density, the process further comprising removing the edge regions and recycling the fibers in the removed edge regions back into the fluid mixture.

27. The system of claim 6, wherein the fibers deposited on the web of carrier substrate comprise an aligned discontinuous fiber layer covered with the cover binder material, and the porous belt comprises a first porous belt having a first direction and a first velocity of travel, the system further configured to combine one or more aligned discontinuous fiber layers into an aligned discontinuous fiber composite material preform, the system comprising:
a second porous belt having a second direction and second velocity of travel;
one or more carrier removal stages configured to remove the cover binder material and carrier substrate from each aligned discontinuous fiber layer while transferring each aligned discontinuous fiber layer to the second porous belt;
a drying stage for removing any liquid remnants from the one or more aligned discontinuous fiber layers;
a polymer stage configured to introduce either a polymer binder or a thermoset or thermoplastic polymer film onto the one or more aligned discontinuous fiber layers;
a heating and consolidation stage configured to apply heat and pressure to impregnate the binder or polymer film into the one or more aligned discontinuous fiber layers, thereby forming an aligned discontinuous fiber composite material preform; and
a cooling and take up stage for cooling and removing the aligned discontinuous fiber composite material preform from the porous belt.

28. The system of claim 27, further comprising a mechanism to maintain stability of each aligned discontinuous fiber layer while removing the carrier substrate.

29. The system of claim 26, wherein the mechanism comprises a comb having a plurality of teeth.

30. The system of claim 27, wherein each carrier removal stage includes a liquid misting system to maintain aligned fiber architecture during carrier removal.

31. The system of claim 27, comprising a source of vacuum positioned beneath the porous belt in one of the carrier removal stages.

32. The system of claim 27, wherein the polymer stage comprises a binder, thermoplastic or thermoset film of selected thickness or areal weight for a desired composite fiber volume fraction.

* * * * *